No. 767,921. PATENTED AUG. 16, 1904.
C. BEALE.
APPARATUS FOR THE PRESERVATION OF FOOD
APPLICATION FILED AUG. 2, 1902.
NO MODEL. 4 SHEETS—SHEET 1.

Fig. 1.

Witnesses.
A. M. Parkins.
M. M. O'Connor.

Inventor.
Charles Beale,
By his Attorneys,
Baldwin Davidson Wight.

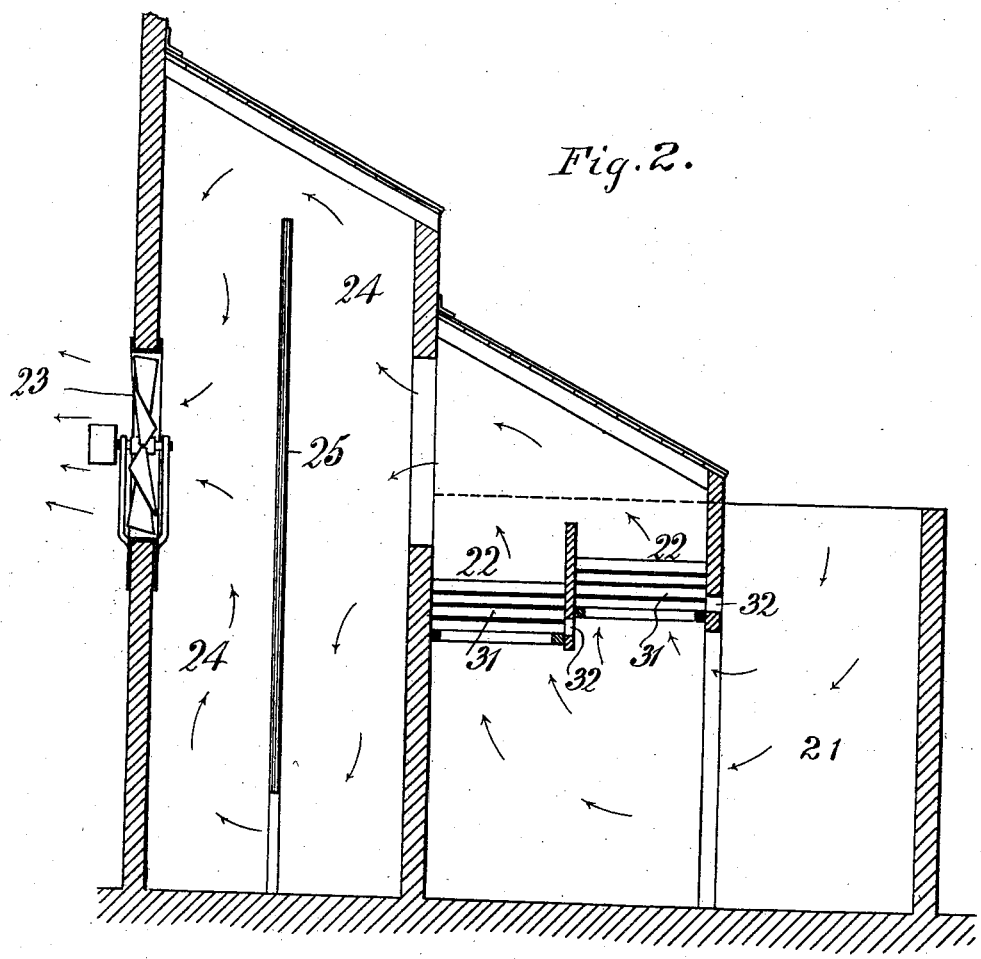

No. 767,921. PATENTED AUG. 16, 1904.
C. BEALE.
APPARATUS FOR THE PRESERVATION OF FOOD.
APPLICATION FILED AUG. 2, 1902.
NO MODEL.
4 SHEETS—SHEET 3.
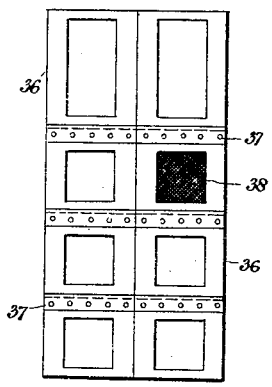
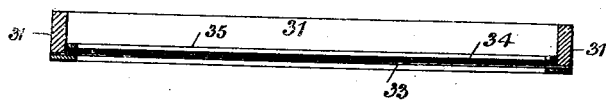
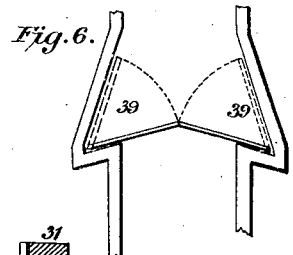
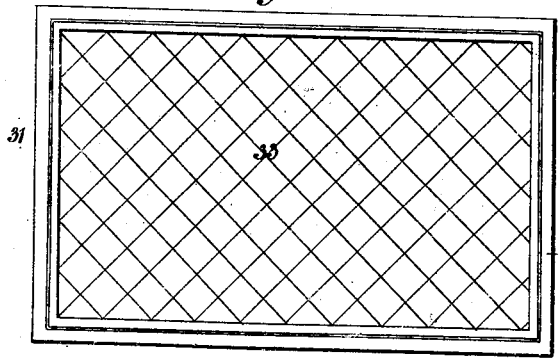
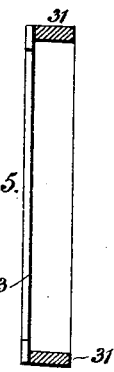

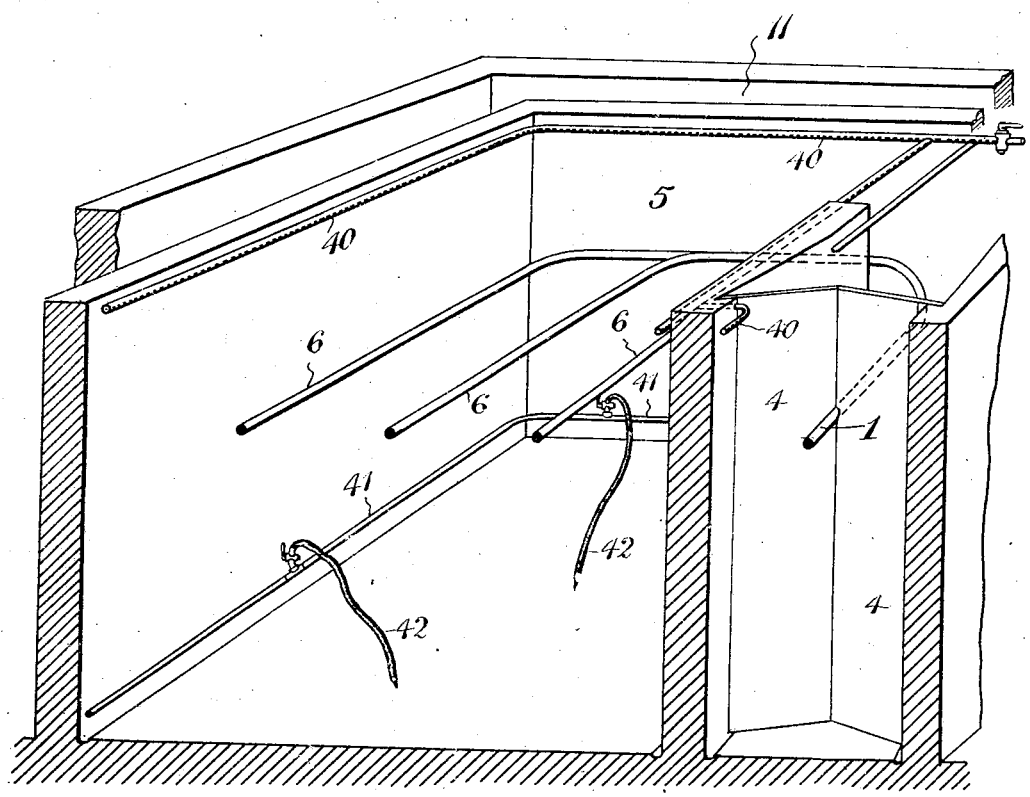

No. 767,921. Patented August 16, 1904.

UNITED STATES PATENT OFFICE.

CHARLES BEALE, OF LONDON, ENGLAND.

APPARATUS FOR THE PRESERVATION OF FOOD.

SPECIFICATION forming part of Letters Patent No. 767,921, dated August 16, 1904.

Application filed August 2, 1902. Serial No. 118,102. (No model.)

*To all whom it may concern:*

Be it known that I, CHARLES BEALE, gentleman, a subject of the King of Great Britain, residing at the Colonial Club, Whitehall Court, London, England, have invented a certain new and useful Improvement in Apparatus for the Preservation of Food and other Perishable Matters, of which the following is a specification.

It is well known that putrefaction and decay are due to the action of minute organisms and that although these organisms are found to be present in the air, water, and general surroundings and in the organs, hair, or feathers of animals they are not normally present in flesh.

This invention is based upon this knowledge, and relates, primarily, to appliances whereby the skin and viscera are removed from the carcass without these organisms being transferred to the flesh, and the flesh is subsequently protected against contamination.

The invention is also applicable to the cooking, curing, and packing of all descriptions of food and other perishable goods and liquors.

The principal appliance consists of a sterilized chamber supplied with filtered or otherwise sterilized air under a slight pressure, but sufficient to insure that the air tends to escape and not to enter through the necessary openings in the building, (other than the proper inlet for air,) which are all provided with double doors worked in a similar way to lock gates, one always being closed, and with gauze panels and sprays to prevent the entrance of flies. The inner surfaces of the chamber are covered with glycerin or the like to entrap any dust or organisms which may accidentally enter.

The animal at the time of killing is secured on a cradle or suspended platform hung from an overhead carrier in such manner that the carcass may be turned into any desired position and removed from one place to another. After the animal has been killed all the natural openings in the body and those caused by killing or bleeding are plugged by antiseptic plugs of cotton, wool, or the like, and the hair of the body is treated with antiseptic or adhesive fluid to kill or fix the organisms in it. The carcass so prepared is run on the railway into the chamber.

The motive power on the railways in the chamber is preferably either gravity or electricity, ropes or mechanism, which could introduce germs, being avoided.

The workmen preferably enter the chamber through a bath, and all water, clothing, tools, and utensils employed are sterilized.

The carcass when inside the chamber is lowered onto a skinning-bench and the hair is cut away and the skin is sterilized along the lines of the incisions to be made. The edges of the first portion of the incision are secured to elastic or weighted cords, which tend to draw the skin backward away from the flesh and to turn the inside of the skin outward, thus avoiding the necessity of the hairy side coming into contact with the flesh or with the skinners' hands. As it is skinned and eviscerated the carcass is treated both inside and out, (by means of gas-burners or sprays provided in convenient portions for the purpose,) so as to destroy any organisms which may by chance have lodged upon it, and as the process proceeds it is gradually hauled up to a hook attached to a carrier on the overhead railway, and when the operation is complete it is run into the store, which forms a part of the sterile premises, where it hangs until it has properly set.

As a further precaution, a sterilized bag distended by a frame, so that it shall not come into contact with the meat, may be suspended over the hanging-hook and the carcass be hauled up into it and retained in it as long as it remains suspended, either within the sterilized premises or elsewhere. In cases where the meat is likely to be handled a second covering is provided at the parts which come into contact with the butchers' or lumpers' hands and bodies, made waterproof or impervious to moisture.

Germ-free meat properly set possesses a remarkable degree of immunity from the action of the putrefactive organisms, and meat treated as above described and hung in a calico bag possesses a considerable power of resisting contamination. Other descriptions of perishable matter may be sterilized by heat or otherwise and cooked, preserved, cured, packed, bottled, or otherwise dealt with in similar chambers and their subsequent sterility preserved by means of any suitable protecting-coverings into which they are introduced within the chamber. Premises so sterilized may be used for all purposes for which a germ or dust proof atmosphere is desirable.

The introduction of air through the filters is regulated by means of a fan, and the filters are preferably constructed of panels of wire-gauze and covered with sterilized cotton-wool, slag-wool, or spun or granulated material. These panels fit into guides forming a framework, each set of guides being sufficiently long to receive three or more of the panels, through which the incoming air has to pass successively. The guides are set at an angle to the wall and are slotted, so that the outer dirty filters can be removed sidewise from the outside, while the clean filters to replace them are inserted from the inside of the premises.

The drawings illustrate appliances made in accordance with my invention.

Figure 1 is a plan of the premises. Fig. 2 is a vertical section of the air-filter, the settling-well, and the fan. Figs. 3, 4, and 5 show detail views of the same. Figs. 6 and 7 show details of the doors. Fig. 8 is a view on an enlarged scale and in section illustrating the arrangement of the tracks or tram-lines in the dressing-chamber and the arrangement of spray-pipes for discharging glycerin or the like along the passages. This figure also shows a gas-pipe provided with flexible pipes to which flaming burners are attached.

1 is a tram-line shown by dotted lines leading from the slaughter-yard 2 down the entrance-passage 3, provided with automatically-closing doors 4 to the dressing-chamber 5, where it branches into loops 6 to allow of several carcasses being skinned at one time. The line 1 then leads through the door 7 of the chamber 5 and the doors 8 to the store 9, where it meets a number of lines 10, upon which the carcasses are stored until they are cool and properly set. The return-line leads down the passage 11 to the exit-passage 12, provided with automatically-closing doors 13. Another passage (not shown, but can conveniently be above or below the passage 12) is provided for the withdrawal of offal. Along the passages are spray-pipes 40 or the like for spraying glycerin or soap-lyes containing glycerin, which prevents flies and the like from entering the premises.

The operators' quarters consist of a disrobing-room 14, at the entrance of which is a double door 15, a water-closet 16, a bath-room 17, and a robing-room 18.

19 and 20 represent other rooms provided.

The air is sucked through a well 21, where any dirt can settle, and filter 22 by a fan 23 into a low-pressure chamber 24, in which is a screen 25, the function of which is to distribute the pressure of the air drawn by the fan through the filter in the manner indicated in Fig. 2. The air passes into the chamber 26, whence it circulates through the building at a pressure slightly in excess of atmospheric pressure, thus preventing the outside air from entering.

27 is an outhouse containing a boiler 28 for providing steam for driving the fan and hot water for the sterilizer 29, situated in the room 30.

The filter 22 consists of frames 31, placed one above the other and easily removable through the opening 32 when it is desired to clean and sterilize them. On the frames 31 is stretched gauze 33, cotton-wool 34 being held between the gauze and the bars 35.

Figs. 6 and 7 show a plan and elevation of a pair of doors. Each door is built up of segments 36, which carry bars 37 for opening an upper segment when a lower is opened. The sections are fitted with gauze 38 to allow the exit of air. The sides of the passages may conveniently be made with recesses 39 to allow for the maximum opening of the doorway.

In Fig. 8, 41 indicates a pipe supplying gas to flexible pipes 42, on the outer ends of which flaming burners may be located.

I do not herein claim the method or process herein described, as such is claimed in my application for patent, Serial No. 124,823, filed September 25, 1902.

What I claim is—

1. The herein-described apparatus for the treatment and preservation of food, comprising a building having a chamber connected with an entrance-passage having a series of sets of double doors opening inward and an exit-passage having a series of sets of double doors opening outward, an air-filter and means for causing air to enter said chamber through the filter and for producing and maintaining an air-pressure within the chamber in excess of the pressure outside the building.

2. The herein-described apparatus for the treatment and preservation of food, comprising a building having a chamber connected with an entrance having a series of sets of double doors provided with gauze-covered openings and opening inward, and an exit-passage having a series of sets of double doors provided with gauze-covered openings and opening outward, an air-filter, and means for causing air to enter said chamber through the filters, and for producing and maintaining an air-pressure within the chamber in excess of the pressure outside the building.

3. The herein-described apparatus for the treatment and preservation of food, comprising a building having a chamber connected with an entrance-passage having a series of sets of double doors opening inward only, and an exit-passage having a series of sets of double doors opening outward only, an air-filter, and means for causing air to enter said chamber through the filter, and for producing and maintaining an air-pressure within the building in excess of the outside pressure.

4. The herein-described apparatus for the treatment and preservation of food, comprising a building having a chamber connected with an entrance-passage having a series of sets of double doors opening inward, means in said passage for spraying germ-destroying substances therein, an exit-passage having a series of sets of double doors opening outward, an air-filter, and means for causing air to enter said chamber through the filter and for producing and maintaining an air-pressure within the chamber in excess of the pressure outside the building.

5. The herein-described apparatus for the treatment and preservation of food, comprising a building divided into communicating chambers for the treatment of the food and its storage, and for the workmen's toilet, an entrance-passage to the treating-chamber provided with double sets of doors opening inward and with spraying-nozzles, an exit-passage provided with a series of sets of double doors opening outward, an air-filter, means for causing air to enter the building through the filter and for producing and maintaining an air-pressure within the building in excess of the pressure outside thereof.

CHARLES BEALE.

Witnesses:
WILFRED CARPMAEL,
JOHN H. WHITEHEAD.